US008600009B1

(12) United States Patent
Croak et al.

(10) Patent No.: US 8,600,009 B1
(45) Date of Patent: Dec. 3, 2013

(54) METHOD AND APPARATUS FOR MAPPING MEDIA ACCESS CONTROL ADDRESSES TO SERVICE ADDRESSES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1494 days.

(21) Appl. No.: 11/253,900

(22) Filed: Oct. 19, 2005

(51) Int. Cl.
*H04M 11/04* (2006.01)

(52) U.S. Cl.
USPC ............................... 379/45; 370/353; 370/356

(58) Field of Classification Search
USPC ...................... 370/352, 353, 354, 356; 379/45
See application file for complete search history.

(56) References Cited

U.S. PATENT DOCUMENTS

| 6,940,950 | B2 * | 9/2005 | Dickinson et al. | 379/45 |
| 7,027,564 | B2 * | 4/2006 | James | 379/37 |
| 7,706,356 | B1 * | 4/2010 | Olshansky et al. | 370/352 |
| 2002/0013896 | A1 * | 1/2002 | Dieterman et al. | 713/100 |
| 2004/0090968 | A1 * | 5/2004 | Kimber et al. | 370/395.54 |
| 2005/0007999 | A1 * | 1/2005 | Becker et al. | 370/352 |
| 2005/0041797 | A1 * | 2/2005 | Bellovin et al. | 379/333 |
| 2005/0083911 | A1 * | 4/2005 | Grabelsky et al. | 370/352 |
| 2006/0274725 | A1 * | 12/2006 | Freitag et al. | 370/352 |
| 2007/0121598 | A1 * | 5/2007 | McGary | 370/356 |

* cited by examiner

*Primary Examiner* — Ahmad Matar
*Assistant Examiner* — Oleg Asanbayev

(57) ABSTRACT

A method and apparatus for enabling broadband access providers to use the subscriber service address associated with the Media Access Control (MAC) address and the Internet Protocol (IP) address of the subscriber's Digital Subscriber Loop (DSL) modem or cable modem as the service address that is sent to the appropriate Public Safety Answering Point (PSAP) are disclosed. The present method enables a mapping between a subscriber's VoIP telephone number, broadband access modem MAC and IP addresses, and the subscriber's registered broadband service address to determine the correct PSAP to route an E911 call to.

7 Claims, 4 Drawing Sheets

METHOD AND APPARATUS FOR MAPPING MEDIA ACCESS CONTROL ADDRESSES TO SERVICE ADDRESSES

The present invention relates generally to communication networks and, more particularly, to a method and apparatus for mapping Media Access Control addresses to service addresses for providing services such as enhanced 911 calls in communication networks, e.g., packet networks such as Voice over Internet Protocol (VoIP) networks.

BACKGROUND OF THE INVENTION

One of the primary benefits of VoIP services is the ability to allow a subscriber to choose an out of area phone number that is not within the local calling area of the subscriber's registered service address. A subscriber requests an out of area phone number that is outside of the geographical location of their service address in order to have a local presence in a particular desired region. When a subscriber's service address does not map to the local calling area of the subscriber's out of area phone numbers, the subscriber is not eligible for enhanced 911 services. More importantly, the ineligibility of enhanced 911 (E911) services prevents subscribers with out of area phone number from receiving help using their subscribed VoIP services in an emergency situation.

Therefore, a need exists for a method and apparatus for mapping Media Access Control addresses to subscriber service addresses for providing services such as enhanced 911 calls in a packet network, e.g., a VoIP network.

SUMMARY OF THE INVENTION

In one embodiment, the present invention enables broadband access providers to use the subscriber service address associated with a node address, e.g., a Media Access Control (MAC) address and the Internet Protocol (IP) address of the subscriber's Digital Subscriber Loop (DSL) modem or cable modem as the service address that is sent to the appropriate Public Safety Answering Point (PSAP). The present invention enables a mapping between a subscriber's VoIP telephone number, broadband access modem MAC and IP addresses, and the subscriber's registered broadband service address to determine the correct PSAP to route an E911 call to. In one embodiment, a MAC address is a 48 bit hardware address assigned by the Institute of Electrical and Electronic Engineers (IEEE) that uniquely identifies a node within a network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
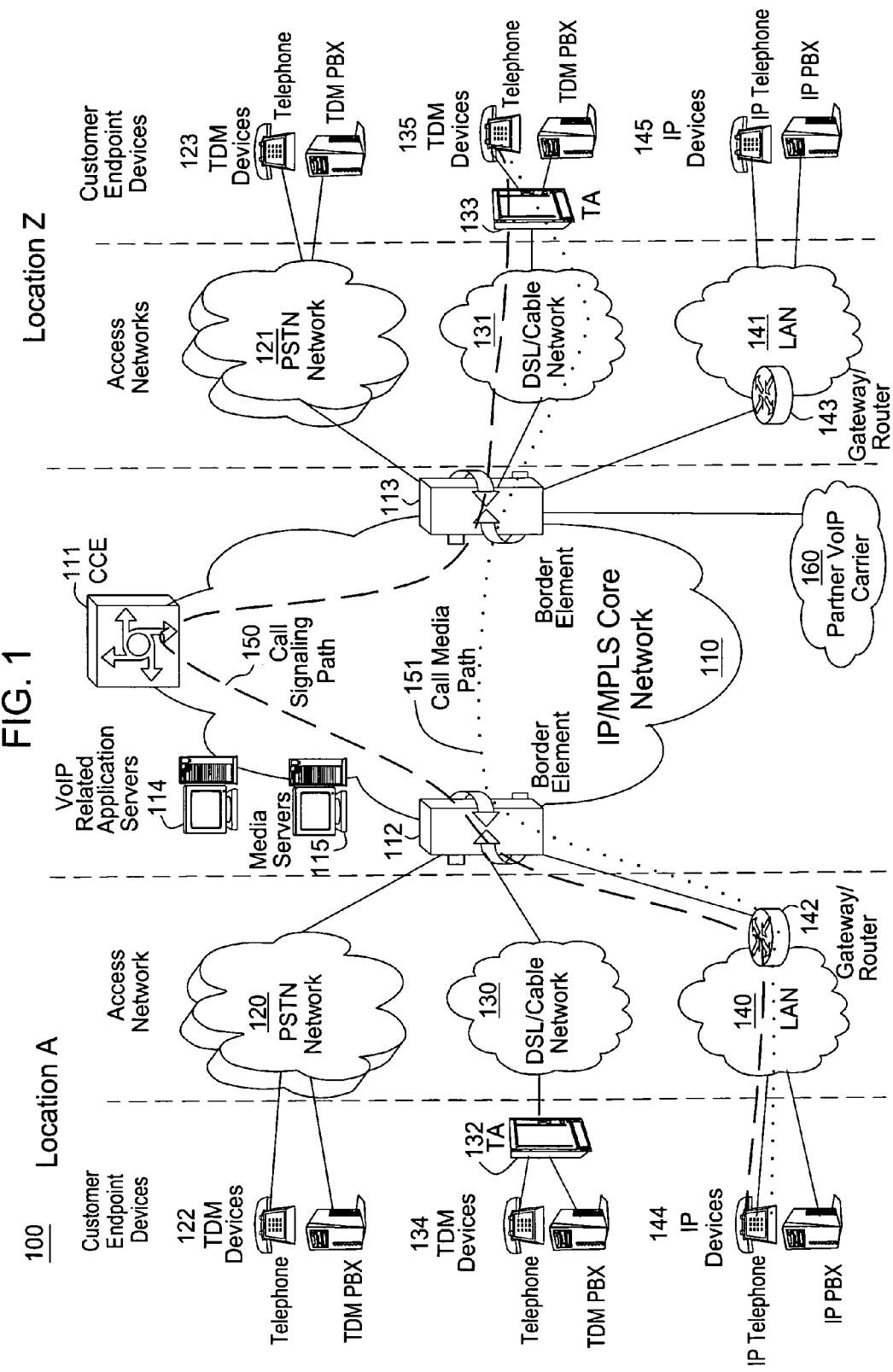
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

One of the primary benefits of VoIP services is the ability to allow a subscriber to choose an out of area phone number that is not within the local calling area of the subscriber's registered service address. A subscriber requests an out of area phone number that is outside of the geographical location of their service address in order to have a local presence in a particular desired region. When a subscriber's service address does not map to the local calling area of the subscriber's out of area phone numbers, the subscriber is not eligible for enhanced 911 services. More importantly, the ineligibility of enhanced 911 (E911) services prevents subscribers with out of area phone number from receiving help using their subscribed VoIP services in an emergency situation. E911 is an emergency response service that allows emergency personnel at a Public Safety Answering Point (PSAP) to receive the location of a caller placing the emergency call and the calling party phone number. A PSAP is an emergency response center that is responsible for answering E911 calls for emergency assistance from police, fire and ambulance services.

To address this criticality, in one embodiment the present invention enables broadband access providers to use the subscriber service address associated with a node address, e.g., a Media Access Control (MAC) address and the Internet Protocol (IP) address of the subscriber's broadband access modem, e.g., a Digital Subscriber Loop (DSL) modem or a cable modem as the service address that is sent to the appropriate Public Safety Answering Point (PSAP). The present invention enables a mapping between a subscriber's VoIP telephone number, broadband access modem MAC and IP addresses, and the subscriber's registered broadband service address to determine the correct PSAP to route an E911 call to. In one embodiment, a MAC address is a 48 bit hardware address assigned by the Institute of Electrical and Electronic Engineers (IEEE) that uniquely identifies a node within a network.

Figure 2:
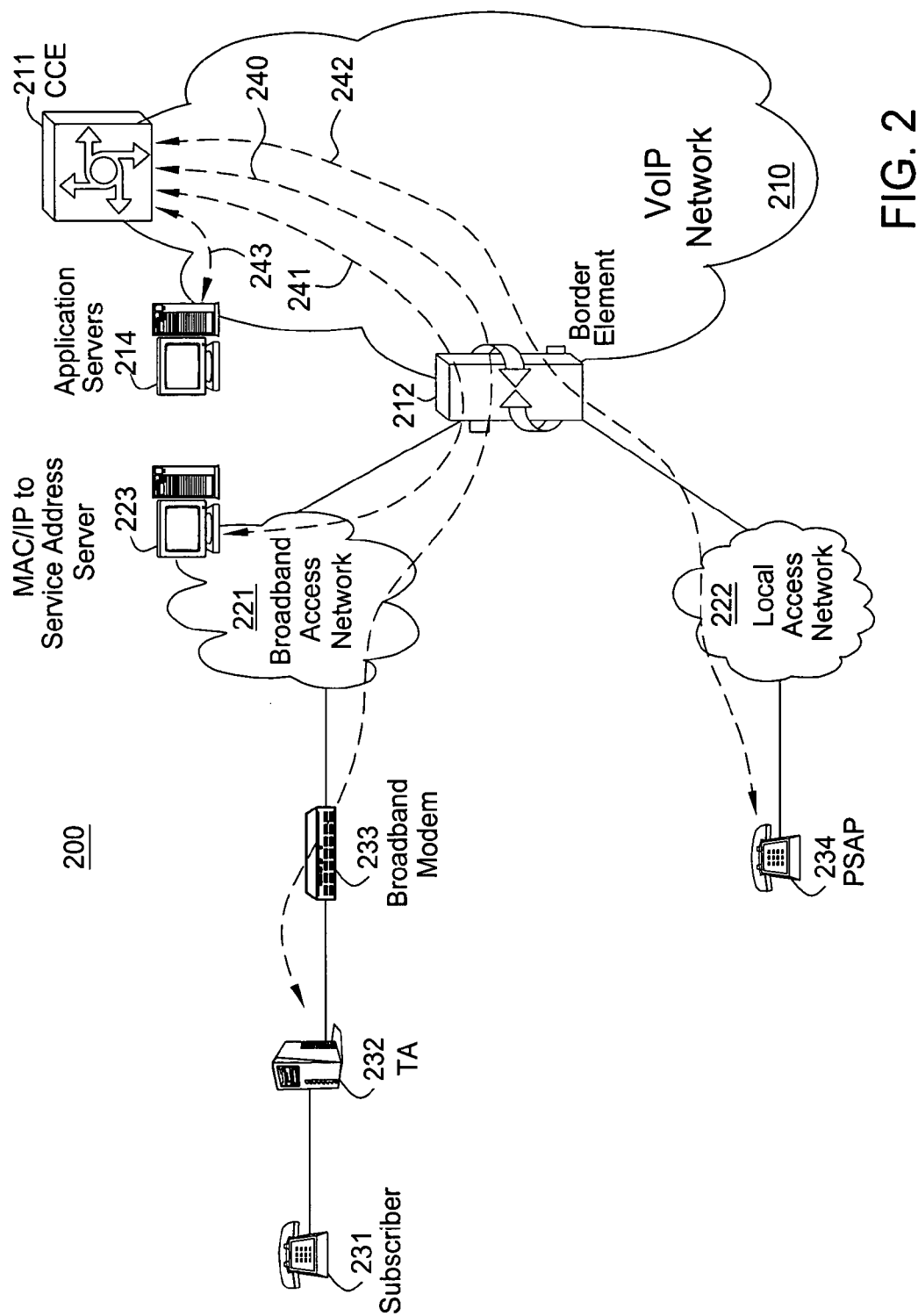
FIG. 2 illustrates an example of mapping Media Access Control addresses to service addresses for enhanced 911 calls in a VoIP network of the present invention.

FIG. 2 illustrates an exemplary communication architecture 200 for mapping Media Access Control addresses to service addresses for services, e.g., enhanced 911 calls in a packet network, e.g., a VoIP network of the present invention. In FIG. 2, subscriber 231 is a registered subscriber of VoIP services of VoIP network 210 and also a registered subscriber of broadband services of broadband access network 221. Subscriber 231 uses TA 232 to access VoIP services using access broadband access network 221 via broadband modem 233.

When subscriber 231 signs up for broadband services, the MAC address and the assigned IP address of broadband modem 233 are stored and tracked by broadband access network 221 and the MAC address and the IP address are associated with the service address of subscriber 231. Therefore, if the MAC address and the IP address of broadband modem are known, the service address of subscriber 231 can also be obtained.

When subscriber 231 signs up for VoIP services, the assigned VoIP out of area phone number of TA 232 is stored and tracked by VoIP network 210 and the phone number is associated with the service address of subscriber 231. Therefore, if the out of area phone number of TA 232 is known, the service address of subscriber 231 can also be obtained. However, subscriber 231 can freely move to another location other than the registered service address to use the subscribed VoIP services with the same phone number.

When subscriber 231 places a call for emergency service, e.g., an E911 call, through VoIP network 210, the call setup message is sent by TA 232 via broadband modem 233 and broadband access network 221 to BE 212 and subsequently to CCE 211 using signaling flow 240. Upon receiving the E911 call setup message, CCE 211 finds out that the phone number of subscriber 231, the calling party, is an out of area phone number; therefore, CCE 211 communicates with MAC/IP to service address server 223 via BE 212 and broadband access network 221 using signaling flow 241. CCE 211 uses the MAC and IP address pair of broadband modem 233 to obtain the MAC and IP address mapping to the registered broadband service address of subscriber 231. Upon receiving the registered service address of broadband modem 233, CCE 211 sends the E911 call setup message comprising the service address of subscriber 231 and the out of area phone number to PSAP 234 via BE 212 and local access network 222 using signaling flow 242. Note that local access network 222 is typically a PSTN network.

Figure 3:
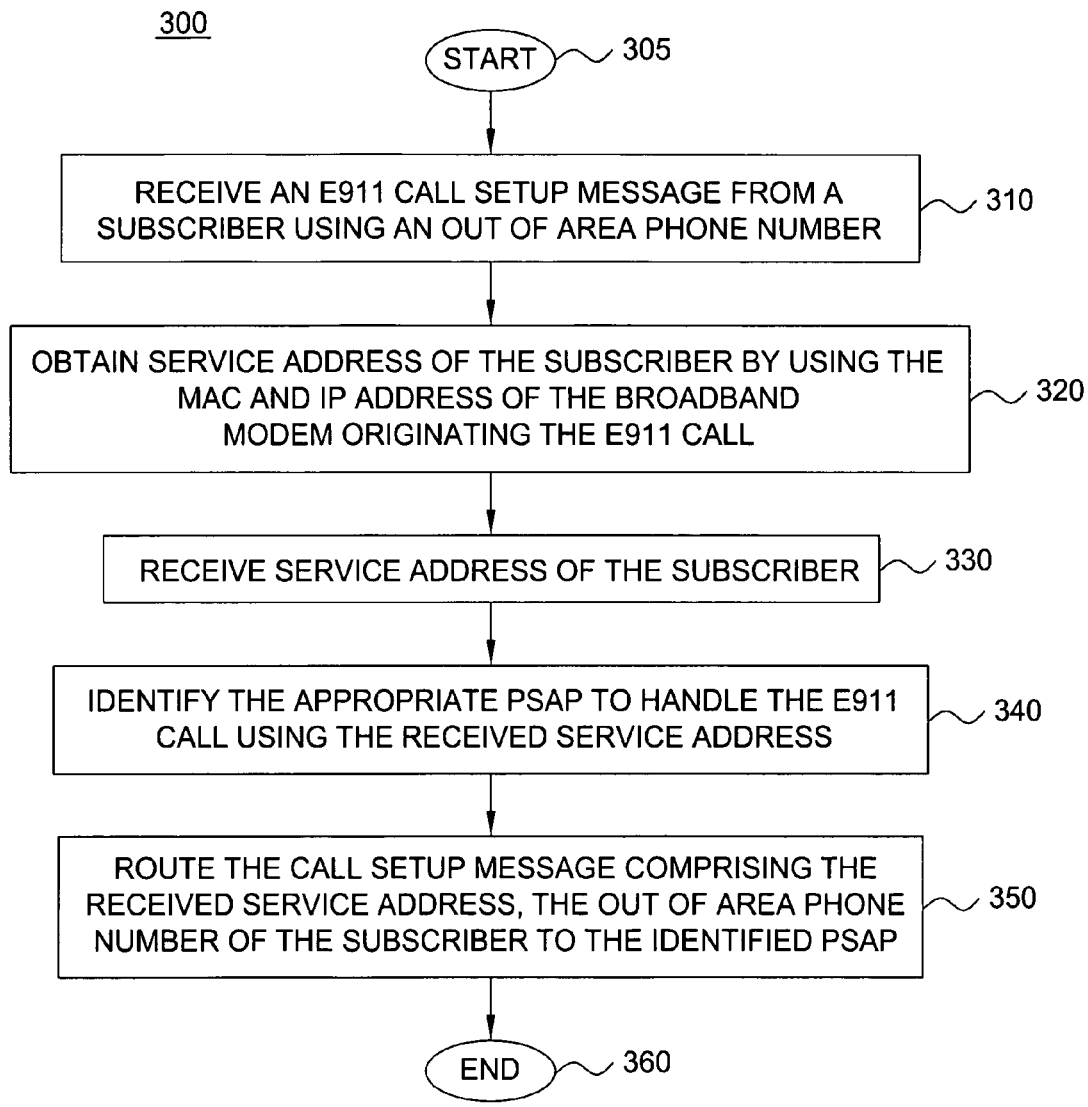
FIG. 3 illustrates a flowchart of a method for mapping Media Access Control addresses to service addresses for enhanced 911 calls in a VoIP network of the present invention.

FIG. 3 illustrates a flowchart of a method 300 for mapping Media Access Control addresses to service addresses for enhanced 911 calls in a packet network, e.g., a VoIP network of the present invention. For example, the method can be executed by a CCE. Method 300 starts in step 305 and proceeds to step 310.

In step 310, the method receives a call setup message associated with a call for emergency service, e.g., an E911 call setup message, from a subscriber using an out of area phone number. It should be noted that the present invention is not limited by the use of 3 digits (e.g., 911) that are typically used to request for emergency services. Any number that is used in making a call for emergency service is within the scope of the present invention.

In step 320, the method obtains the service address of the subscriber by mapping the MAC and IP address of the broadband modem originating the E911 call to the required service address. The address mapping is performed by a MAC/IP to service address server maintained by the broadband access network from which the E911 call originates.

In step 330, the method receives the obtained service address of the subscriber.

In step 340, the method identifies the appropriate PSAP to handle the E911 call using the received service address. For example, the method identifies a PSAP that is responsible for E911 calls originated within the local calling area of the received service address.

In step 350, the method routes the E911 call setup message comprising the received service address and the out of area phone number of the subscriber to the identified PSAP. The method ends in step 360.

Figure 4:
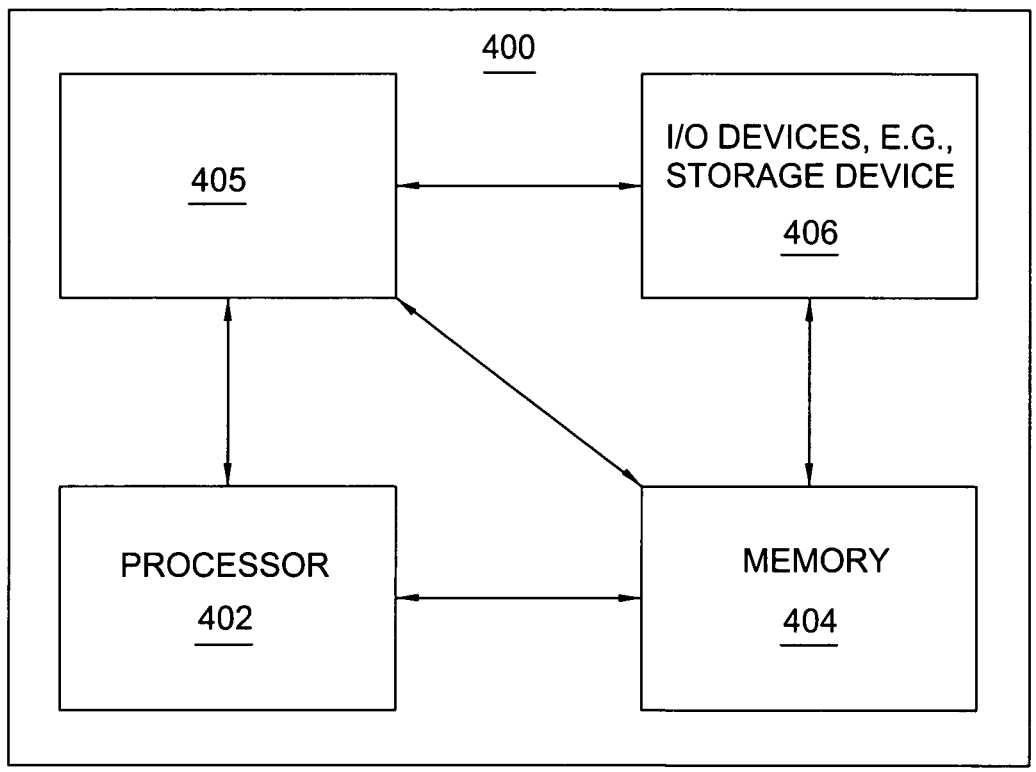
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for mapping Media Access Control addresses to service addresses for enhanced 911 calls, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for mapping Media Access Control addresses to service addresses for enhanced 911 calls can be loaded into memory 404 and executed by processor 402 to implement the functions as discussed above. As such, the present process 405 for mapping Media Access Control addresses to service addresses for enhanced 911 calls (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling a call for emergency service in a communication network, comprising:

receiving, via a processor of a call control element in the communication network, a call setup message for an emergency service from an endpoint device used by a subscriber, wherein the communication network is a voice over internet protocol network;

using, via the processor, a node address and an internet protocol address of the endpoint device to obtain a broadband subscriber service address from a broadband access network, wherein the node address and the internet protocol address are stored and tracked by the broadband access network and the node address and the internet protocol address are associated with the broadband subscriber service address during a sign up of a broadband service by the subscriber, wherein the broadband access network and the communication network are distinct networks, wherein the endpoint device is a broadband network modem, wherein the broadband subscriber service address is obtained from an address server of the broadband access network;

identifying, via the processor, a public safety answering point in accordance with the broadband subscriber service address; and forwarding, via the processor, the call setup message for the emergency service and the broadband subscriber service address to the public safety answering point for handling, wherein a phone number in the call setup message comprises an out of area phone number of the subscriber that is outside of a geographical location of the public safety answering point and the broadband subscriber service address does not map to a local calling area of the out of area phone number, wherein the out of area phone number is chosen by the subscriber and is not within a local calling area of the broadband subscriber service address.

2. The method of claim 1, wherein the node address is a media access control address.

3. A non-transitory computer-readable medium storing a plurality of instructions which, when executed by a processor of a call control element in a communication network, cause the processor to perform operations for handling a call for emergency service in the communication network, the operations comprising:

receiving a call setup message for an emergency service from an endpoint device used by a subscriber, wherein the communication network is a voice over internet protocol network;

using a node address and an internet protocol address of the endpoint device to obtain a broadband subscriber service address from a broadband access network, wherein the node address and the internet protocol address are stored and tracked by the broadband access network and the node address and the internet protocol address are associated with the broadband subscriber service address during a sign up of a broadband service by the subscriber, wherein the broadband access network and the communication network are distinct networks, wherein the endpoint device is a broadband network modem, wherein the broadband subscriber service address is obtained from an address server of the broadband access network;

identifying a public safety answering point in accordance with the broadband subscriber service address; and forwarding the call setup message for the emergency service and the broadband subscriber service address to the public safety answering point for handling, wherein a phone number in the call setup message comprises an out of area phone number of the subscriber that is outside of a geographical location of the public safety answering point and the broadband subscriber service address does not map to a local calling area of the out of area phone number, wherein the out of area phone number is chosen by the subscriber and is not within a local calling area of the broadband subscriber service address.

4. The non-transitory computer-readable medium of claim 3, wherein the node address is a media access control address.

5. The non-transitory computer-readable medium of claim 3, wherein the call setup message is forwarded by the call control element.

6. An apparatus for handling a call for emergency service in a communication network, comprising:

a processor of a call control element in the communication network; and a computer-readable medium storing a plurality of instructions which, when executed by the processor, cause the processor to perform operations, the operations comprising:

receiving a call setup message for an emergency service from an endpoint device used by a subscriber, wherein the communication network is a voice over internet protocol network;

using a node address and an internet protocol address of the endpoint device to obtain a broadband subscriber service address from a broadband access network, wherein the node address and the internet protocol address are stored and tracked by the broadband access network and the node address and the internet protocol address are associated with the broadband subscriber service address during a sign up of a broadband service by the subscriber, wherein the broadband access network and the communication network are distinct networks, wherein the endpoint device is a broadband network modem, wherein the broadband subscriber service address is obtained from an address server of the broadband access network;

identifying a public safety answering point in accordance with the broadband subscriber service address; and forwarding the call setup message for the emergency service and the broadband subscriber service address to the public safety answering point for handling, wherein a phone number in the call setup message comprises an out of area phone number of the subscriber that is outside of a geographical location of the public safety answering point and the broadband subscriber service address does not map to a local calling area of the out of area phone number, wherein the out of area phone number is chosen by the subscriber and is not within a local calling area of the broadband subscriber service address.

7. The apparatus of claim 6, wherein the node address is a media access control address.

* * * * *